US006760055B2

United States Patent
Toki et al.

(10) Patent No.: US 6,760,055 B2
(45) Date of Patent: Jul. 6, 2004

(54) PHOTOGRAPHIC PROCESSING APPARATUS

(75) Inventors: Akihiko Toki, Wakayama (JP);
Yoshiharu Tokumatsu, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 10/176,404

(22) Filed: Jun. 21, 2002

(65) Prior Publication Data

US 2002/0196474 A1 Dec. 26, 2002

(30) Foreign Application Priority Data

Jun. 21, 2001 (JP) .............................. 2001-187973

(51) Int. Cl.[7] .............................. B41J 2/435; B41J 2/47
(52) U.S. Cl. ................................ 347/247; 347/237
(58) Field of Search .............................. 347/237, 239, 347/247, 253, 236, 246, 250, 255

(56) References Cited

U.S. PATENT DOCUMENTS

| 4,307,408 A | * | 12/1981 | Kiyohara et al. | ............ 347/255 |
|---|---|---|---|---|
| 4,583,128 A | | 4/1986 | Anderson, Jr. et al. | ...... 358/302 |
| 6,108,024 A | * | 8/2000 | Mitsui et al. | ................ 347/250 |
| 6,108,025 A | | 8/2000 | Li et al. | ...................... 347/256 |
| 2002/0008756 A1 | * | 1/2002 | Hirooka et al. | .............. 347/246 |

FOREIGN PATENT DOCUMENTS

EP          1 158 772 A      11/2001     .......... H04N/1/407

* cited by examiner

Primary Examiner—Hai Pham
(74) Attorney, Agent, or Firm—Smith Patent Office

(57) ABSTRACT

A photographic processing apparatus according to the present invention exposes photographic papers using a laser beam modulated based on image data and includes a laser beam emitting device. A changeover part changes the level of a driving signal to any one of a plurality of discrete levels according to a coloring characteristic of the photographic paper. The level of the driving signal determines the intensity of the laser beam outputted from the laser beam emitting device in a plurality of levels (for example, three levels consisting of a high level, a middle level and a low level). A filter is also provided to reduce the intensity of the laser beam outputted from the laser beam emitting device.

4 Claims, 3 Drawing Sheets

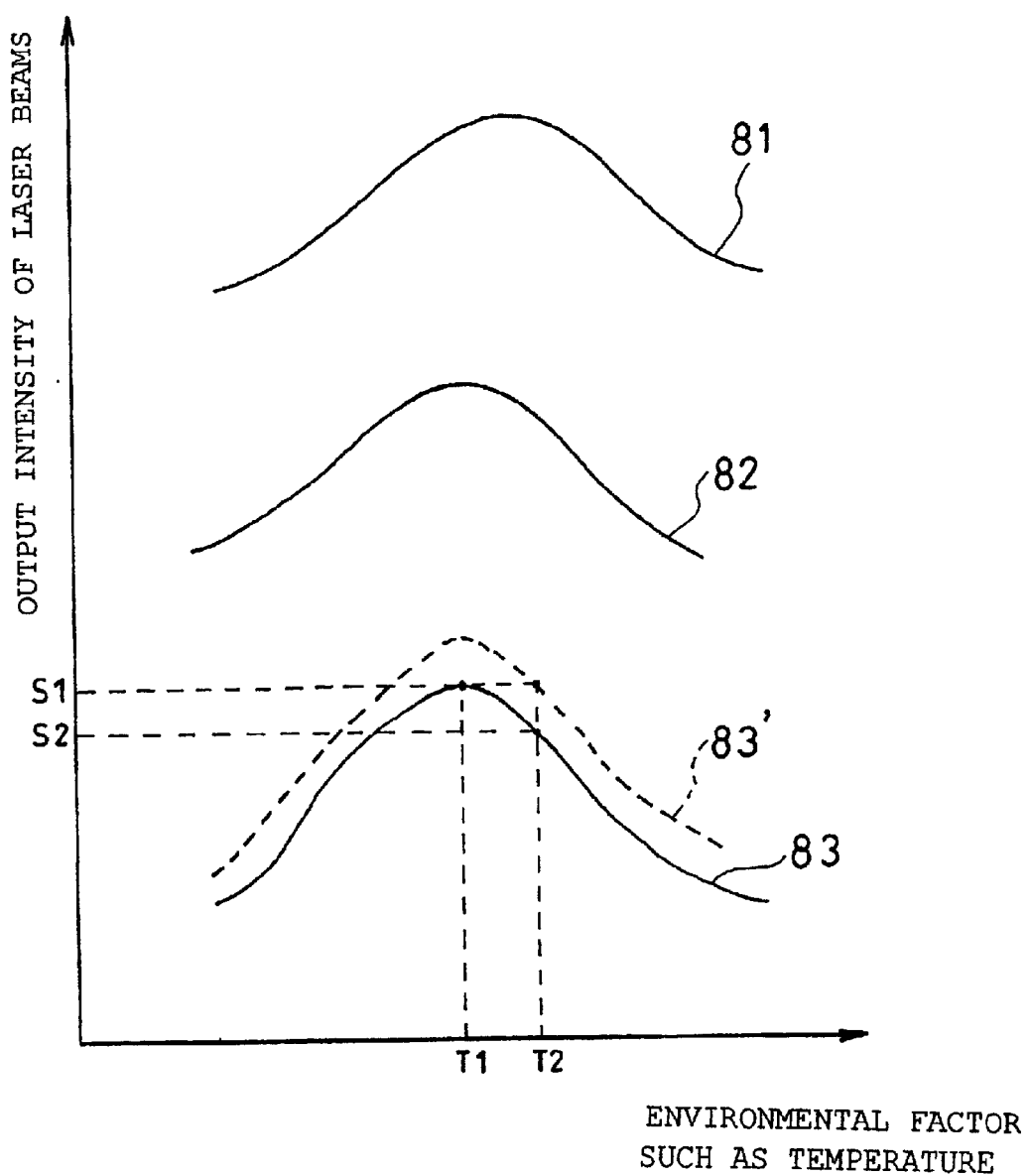

PHOTOGRAPHIC PROCESSING APPARATUS

TECHNICAL FIELD OF THE INVENTION

The present invention relates to a photographic processing apparatus which exposes photographic papers using a laser beam modulated based on image data.

BACKGROUND OF THE INVENTION

Recently, a photographic processing apparatus which adopts a so-called digital exposure method has been popularly used. In such a digital exposure method, a photographic papers are exposed by light modulated based on digital image data. By adopting the digital exposure method, various types of image processes such as color correction, concentration correction and sharpening processing can be performed with the high degree of freedom and, at the same time, a rapid additional printing processing can be realized. Further, it is possible to obtain prints of high quality which are excellent in the reproducibility of color and concentration and resolution.

As one type of such a digital exposure method, there has been known a scanning exposure method which exposes the photographic papers with a modulated laser beam scanned using a polygon mirror or the like. In a current situation, however, the photographic processing apparatus adopting the scanning exposure method cannot change the intensity of the laser beam which are outputted in a stable manner from a laser beam emitting device and hence, the photographic processing apparatus can only cope with the photographic paper having specific coloring characteristics. Accordingly, when a photographic paper having coloring characteristics different from the specific coloring characteristics is used, the quality of images formed on the photographic papers is largely deteriorated.

SUMMARY OF THE INVENTION

It is a primary object of the present invention to provide a photographic processing apparatus which can properly expose a plurality of types of photographic papers having coloring characteristics different from each other in conformity with these coloring characteristics.

With respect to the photographic processing apparatus of the present invention, the photographic processing apparatus which exposes photographic papers using a laser beam modulated based on image data includes a laser beam emitting device and changeover means for changing over the intensity of a laser beam outputted from the laser beam emitting device in a plurality of levels.

According to this photographic processing apparatus, since the intensity of the laser beam can be changed over in a plurality of levels, it is possible to properly expose photographic papers which differ in color characteristics from each other and the number of types of paper is equal to the number of changeover levels of the intensity of the laser beam. Here, it is preferable that the changeover means is adjusted in advance such that the intensity of the laser beam outputted from the laser beam emitting device at respective levels exhibits a small and stable change rate with respect to an environmental factor such as temperature.

From a viewpoint of obtaining prints of high quality by stabilizing the intensity of laser beams, it is preferable that the photographic processing apparatus of the present invention is further provided with stabilizing means which is for stabilizing the intensity of the laser beam outputted from the laser beam emitting device.

It is preferable that the photographic processing apparatus of the present invention further includes a filter which is for reducing the intensity of the laser beam outputted from the laser beam emitting device and a filter control means which is for changing over a laser intensity reduction rate obtained by the filter in a plurality of levels.

The intensity of the laser beam depends not only on an input power to the laser beam emitting device but also on the environmental factors such as temperature and hence, in stabilizing the intensity of the laser beam using only one level, it has been necessary to frequently perform a complicated tuning process. To the contrary, by adopting the above-mentioned construction, it is possible to divide the respective intensities of the laser beams so that each laser beam is out putted from the laser beam emitting device into a plurality of levels using a filter. Accordingly, it is unnecessary to additionally perform the complicated tuning process for increasing the number of changeover levels of the intensity of the laser beam outputted from the laser beam emitting device. Thus, it is possible to properly expose a larger number of types of printing papers which differ in coloring characteristics Further, it is preferable that the photographic processing apparatus of the present invention is configured such that changeover means changes over the intensity of the laser beam outputted from the laser beam emitting device at two to five levels. Due to such a construction, the number of changeover levels of the intensity of the laser beam is relatively small, that is, 2 to 5 and hence, the tuning operation of the laser beam emitting device can be reduced.

Other and further objects, features and advantages of the invention will appear more fully from the following description taken in conjunction with the accompanying drawings.

BRIEF DESCRIPTION OF THE DRAWINGS

FIG. 3 is a graph showing the relationship between an output intensity of a laser beam outputted from a laser beam source and an environmental factor such as temperature in the photographic processing apparatus shown in FIG. 1.

DETAILED DESCRIPTION OF THE PREFERRED EMBODIMENTS

One preferred embodiment of the present invention is explained in conjunction with attached drawings.

Figure 1:
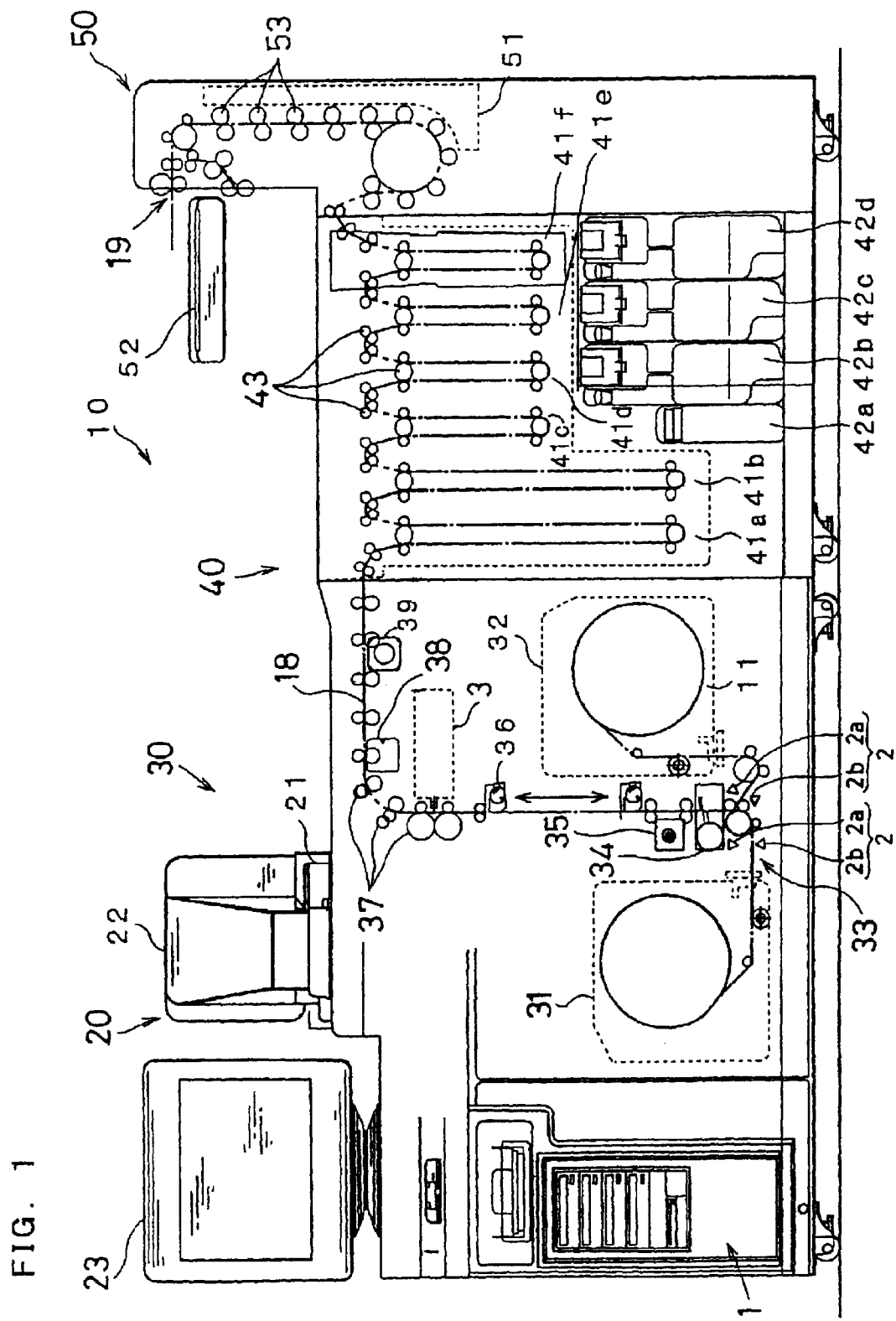
FIG. 1 is a view showing a schematic construction of a photographic processing apparatus according to one embodiment of the present invention.

FIG. 1 is a view showing a schematic construction of a photographic processing apparatus according to this embodiment. The photographic processing apparatus 10 shown in FIG. 1 is comprises a photographic processing apparatus adopting a digital scanning exposure method using a laser beam. The photographic processing apparatus 10 includes a scanner part 20, a printer part 30, a processor part 40 and a finish processing part 50. Photographic papers 11 which are elongated and accommodated in paper magazines 31, 32 which will be explained later are transported to a cutter 34, which will be described later, along a path 18 indicated by a chain line shown in FIG. 1. Then, the photographic papers 11 which are cut to a given length along the widthwise direction using the cutter 34 are transported from the printer part 30 to the finish processing part 50 by way of the processor part 40 along the path 18.

In the scanner part 20, various types of processes such as reading processing of images recorded in respective frames of a film and a digital conversion of read image data are mainly performed. In the printer part 30, exposure processing based on the digital image data is mainly applied to the photographic paper 11 made of photo sensitive material. In the processor part 40, processes such as development, bleaching/fixing and stabilization are applied to the photographic paper 11 which has been already subjected to the exposure. In the finish processing part 50, drying processing is applied to the photographic paper 11 on which images are visualized. Also the photographic papers are discharged from the processor part 40 and the photographic papers 11 which are discharged from a discharge opening 19 after drying are sorted for every order.

The scanner part 20 includes a film mounting unit 21 to which the film is mounted and a scanner light source unit 22 in which a light source which irradiates light to the film at the time of scanning is accommodated. Below the film mounting unit 21, an image pick-up element such as a CCD image sensor (not shown in the drawing) for picking up the film image is arranged. Image signals outputted from the image pick-up element are subjected to digital conversion by an A/D converter not shown in the drawing and, thereafter, are supplied to a control unit 1 which will be explained later.

The printer part 30 includes: two paper magazines 31, 32 which respectively accommodate elongated rolled photographic papers 11 and are selectively used; an advancing unit 33 which pulls out the photographic paper 11 having a given width from the paper magazines 31, 32; the cutter 34 cuts the photographic paper 11 pulled out from the paper magazine 31, 32 into a desired length along the width direction corresponding to a print size; a printing unit 35 which prints given characters on a surface (back surface) of the photographic paper 11 on which a photosensitive emulsion layer is not formed; a chucker 36 which transports the photographic papers 11 cut in a desired length in parallel at two or three rows to a stage before the exposure position; an exposure unit 3 which applies the exposure processing to the photographic paper 11; a plurality of pairs of rollers 37 which transport the photographic paper 11; and motors 38, 39 which are for driving the plurality of pairs of rollers 37. Were, to prevent the cut photographic paper 11 from falling, the plurality of pairs of rollers 37 are arranged at an interval which is shorter than the shortest length which is conceivable as an interval when the photographic papers 11 are cut.

The processor part 40 includes: processing vessels 41a to 41f for applying respective processes comprising development, breaching/fixing and stabilization to the photographic paper 11 supplied from the printer part 30; tanks 42a to 42d for collecting waste liquid from the processing liquid stored in the processing vessels 41a to 41f and for supplementing a fresh processing liquid to the processing vessels 41a to 41f; a plurality of pairs of rollers 43 for transporting the photographic papers 11; and motors (not shown in the drawing) for driving the plurality of pairs of rollers 43.

The finish processing part 50 includes: a heater 51 for rapidly drying the photographic papers 11 discharged from the processor part 40; a belt conveyor 52 for transporting the photographic papers 11 discharged from the discharge opening 19 in the direction perpendicular to a paper surface of FIG. 1; a plurality of pairs of rollers 53 for transporting the photographic papers 11; and motors (not shown in the drawing) for driving the plurality of pairs of rollers 53. Here, to prevent the cut photographic papers 11 from falling, in the same manner as the plurality of pairs of rollers 37, the plurality of pairs of rollers 43 and 53 are also arranged at an interval which is shorter than the shortest length which is conceivable as an interval when the photographic papers 11 are cut.

Further, the photographic processing apparatus 10 shown in FIG. 1 includes the control unit 1 for controlling the operation of the photographic processing apparatus 10 and a display 23 which displays and notices various information on the photographic processing apparatus 10 to an operator.

Figure 2:
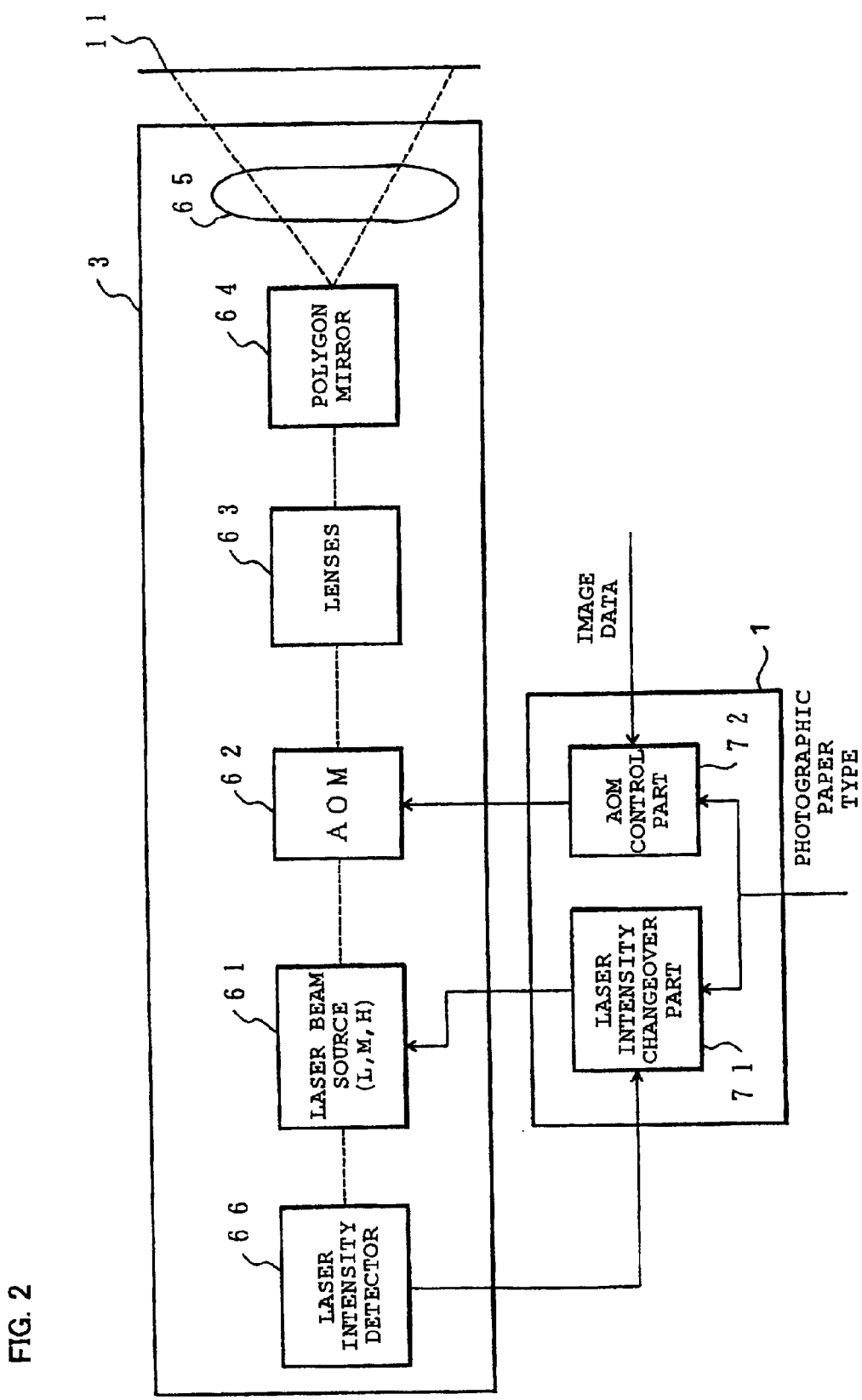
FIG. 2 is a block diagram for explaining an exposure unit used in the photographic processing apparatus shown in FIG. 1.

Subsequently, the exposure unit 3 employed by the photographic processing apparatus 10 of this embodiment is explained. The exposure unit 3 is provided for performing the scanning exposure of the photographic papers 11 using laser beams of three different wavelengths respectively corresponding to three colors consisting of blue (B), green (G) and red (R). As shown in FIG. 2, the exposure unit 3, in the inside of a casing thereof, houses three laser beam sources 61. To simplify the explanation, only one laser beam source 61 is shown in FIG. 2. The same goes for acousto-optic modulators 62, lenses and the like 63 and laser intensity detectors 66.

Laser beams irradiated from respective laser beam sources 61 are incident on the acousto-optic modulators (hereinafter referred to as "AOM") 62 which constitute optic modulators of diffraction grating and which function as filters for lowering the intensity of laser beams. In response to control signals supplied from an AOM control part 72 of the control unit 1, the AOM 62 modulates the laser beam irradiated from the laser beam sources 61 in conformity with image data supplied from the AOM control part 72. The respective laserbeams (primary diffracted beams of AOMs 62) which are diffracted by the AOMs 62 and are modulated in conformity with the image data pass through the lenses and the like 63 consisting of a reflection mirror, an expander lens, a cylindrical lens, a dichroic mirror and the like and, thereafter, are incident on a polygon mirror 64 as one synthesized laser beam.

The polygon mirror 64 is constituted by arranging reflection mirrors on respective side surfaces of a regular hexagonal cylinder and is rotatable about an axis of the regular hexagonal cylinder at a fixed speed. One synthesized laser beam is scanned along with the rotation of the polygon mirror 64 such that the synthesized laser beam is reflected on the reflection mirror arranged on one side surface of the regular hexagonal cylinder. Further, an fθ lens 65 which is arranged between the polygon mirror 64 and the photographic paper 11 shrinks only a diameter in the sub scanning direction of the synthesized laser beam reflected on the polygon mirror 64 and, thereafter, focuses the synthesized laser beam on the photographic paper 11. In this manner, by making the photosensitive emulsion surface of the photographic paper 11 subjected to the line exposure using the laser beam, a latent image of a desired image is formed.

Further, the laser beams irradiated from the respective laser beam sources 61 are also incident on the laser intensity detectors 66 which are arranged at a side opposite to the AOMs 62 with respect to the laser beam sources 61. The laser beam intensity detectors 66 are optical detectors which include photo sensors, CCD sensors or the like and detect the intensities of respective laser beams of blue, green and red irradiated from the corresponding laser beam sources 61. The detected intensities of the laser beams are supplied to a laser intensity changeover part 71 of the control unit 1.

The laser beam intensity changeover part 71 generates driving signals respectively for three laser beam sources 61 based on the type of the photographic papers 11 which are accommodated in the paper magazine 31 or 32 and the laser intensity signals supplied from respective laser intensity detectors 66 and then supplies the driving signals to corresponding laser beam sources 61. To be more specific, the laser intensity changeover part 72 outputs driving signals which are obtained by converting digital signals of 256 stages ranging from 0 to 255 into analog signals using a D/A converter (not shown in the drawing) disposed in the inside of the control unit 1.

In the photographic processing apparatus 10 according to this embodiment, the driving signals generated by the laser intensity changeover part 71 are for changing over the intensity of laser beams irradiated from the laser beam sources 61 to three levels consisting of high level (H), middle level (M) and low level (L) in response to the type of exposed photographic paper 11. The driving signals are also for stabilizing the output intensity of the laser beams at respective levels based on a feedback control using the laser intensities detected by the laser intensity detector 66.

Three levels consisting of high level, middle level and low level are values relative to each other. These three levels are respectively adjusted such that when the laser intensity is at the high level, the photographic paper having the coloring characteristics which require the largest laser intensity can be properly exposed out of the commercially available photographic papers. When the laser intensity is at the middle level, the photographic paper having the coloring characteristics which require the intermediate laser intensity can be properly exposed out of the commercially available photographic papers. Further when the laser intensity is at the low level, the photographic paper having the coloring characteristics which require the relatively small laser intensity can be properly exposed out of the commercially available photographic papers.

Accordingly, when the photographic paper 11 to be exposed is the photographic paper having the coloring characteristics which require the relatively large intensity, the laser intensity changeover part 71 is controlled based on a feedback control using the laser intensities detected by the laser intensity detectors 66. The laser intensity changeover part 71 generates the driving signal which sets the intensity of the laser beams outputted from respective laser beam sources 61 to the high level and, at the same time, stabilizes the output intensities of the laser beams dependent on an environmental factor such as temperature as much as possible at the high level by suppressing the change of the output intensities. A similar control is performed with respect to the case in which the intensity of the laser beams is set to the middle level and the case in which the intensity of the laser beams is set to the low level. In this manner, the driving signals outputted from the laser intensity changeover part 71 are not always fixed under the condition with which the same photographic papers 11 are used and are changed every second depending on the environmental factor.

FIG. 3 is a graph depicting the relationship between the output intensity of laser beams outputted from the laser beam sources 61 and the environmental factor such as temperature in the photographic processing apparatus 10 of the present invention. In FIG. 3, a curve 81 shows a portion of the relationship between the laser intensity and the environmental factor when the driving signal supplied to the laser beam sources 61 is set to a fixed value (for example, "255" of 255 stages) corresponding to the high level of the laser intensity. A curve 82 shows a portion of the relationship between the laser intensity and the environmental factor when the driving signal supplied to the laser beam sources 61 is set to a fixed value (for example, "150" of 255 stages) corresponding to the middle level of the laser intensity. A curve 83 shows a portion of the relationship between the laser intensity and the environmental factor when the driving signal supplied to the laser beam sources 61 is set to a fixed value (for example, "80" of 255 stages) corresponding to the low level of the laser intensity. As shown in FIG. 3, at any levels, the laser output intensity largely depends on the environmental factor such as temperature.

Here, when the laser beams of low level are outputted from the laser beam sources 61 in conformity with the curve 83, assuming the environmental factor as T1, the laser output intensity irradiated from the laser beam sources 61 assumes S1. However, when the environmental factor is changed from T1 to T2, provided that the driving signal is held at a fixed value, the laser output intensity irradiated from the laser beam sources 61 is lowered to S2. Accordingly, in the photographic processing apparatus 10 of this embodiment, the laser output intensity S2 is detected by the laser intensity detector 66 and the laser intensity changeover part 71 performs the feedback control based on the detected value so as to change the magnitude of the driving signals such that the laser output intensity irradiated from the laser beam sources 61 recovers S1 again. For example, in the example shown in FIG. 3, the laser intensity changeover part 71 changes the magnitude of the driving signals such that the relationship between the laser intensity and the environmental factor is expressed by a curve 83' (for example, from "80" to "81" in 255 stages). Due to such a control, the laser output intensity when the environmental factor is T2 assumes S1 which is equal to the laser output intensity when the environmental factor is T1. Accordingly, with respect to the photographic processing apparatus 10 of this embodiment, there is substantially no possibility that the quality of the image formed on the photographic paper 11 is degraded due to the change of the environmental factor. Here, the explanation has been made with respect to the case that the intensity of the laser beams is low, and the same control is performed with respect to the case in which the intensity of the laser beams is set to the high level and the case in which the laser beam intensities are set to the middle level.

In this manner, according to the photographic processing apparatus 10 of this embodiment, the intensity of the laser beams can be changed over to three levels consisting of the high level, the middle level, and the low level using the laser intensity changeover part 71 and hence, three kinds of photographic papers 11 which differ in the coloring characteristics from each other can be properly exposed. Further, according to the photographic processing apparatus 10 of this embodiment, since the intensity of the laser beams can be stabilized by performing the feedback control using the laser intensity detectors 66 and the laser intensity changeover part 71, it is possible to obtain the prints of higher quality.

Further, with respect to the photographic processing apparatus 10 of this embodiment, when the photographic papers 11 which are to be preferably exposed with the laser intensity falling between the high level and the middle level are used, the AOM control part 72 reduces the intensity of the laser output of the high level to a desired value in response to a signal which expresses a type of photographic paper supplied to the AOM control part 72. In the same manner, when the photographic papers 11 which are to be preferably exposed with the laser intensity falling between the middle level and the low level are used and when the photographic papers 11 which are to be preferably exposed with the laser intensity falling below the low level are used, the laser intensity is reduced to a value corresponding to the type of photographic paper 11 to be exposed by the AOM control part 72.

Accordingly, in the photographic processing apparatus 10 of this embodiment, by changing over the laser intensity to the three levels consisting of the high level, the middle level and the low level and by changing the intensity reduction rate at the AOM 62 using the AOM control part 72, it is possible to properly expose a large number of types of photographic papers 11 which differ in color characteristics from each other.

Further, to realize the above-mentioned control which maintains the laser intensity in a stable manner irrespective of the fluctuation of the environmental factor such as temperature, it is necessary to repeatedly perform the cumbersome tuning operation with respect to each level. However, since the photographic processing apparatus 10 of this embodiment is provided with the AOM control part 72 having the above-mentioned function, it is no longer necessary to additionally perform the cumbersome tuning operation for increasing the number of changeover levels of the intensity of the laser beams outputted from the laser beam sources 61. Thus, it is possible to properly expose a larger number of types of photographic papers 11 which differ in coloring characteristics from each other.

Although the level intensity changeover part 71 in this embodiment changes over the intensity of the laser beams outputted from respective laser beam sources 61 to three levels consisting of the high level, the middle level and the low level, the intensity of the laser beams may be changed over at two levels consisting of the high level and the low level. It is also possible to use four or five levels. By suppressing the number of changeovers to a relatively small value, the tuning operation of the laser beam sources 61 can be reduced.

Although one preferred embodiment of the present invention has been explained heretofore, the present invention is not limited to the above-mentioned embodiment and various design modifications are conceivable within the scope of the claims. For example, although the laser output is stabilized by compensating for the fluctuation of the environmental factor using the drive signals outputted from the laser intensity changeover part 71 in the above-mentioned embodiment, the fluctuation of the environmental factor may be compensated by the laser intensity reduction rate at the AOM 62 in place of the driving signals. Further, by superposing the image data on the driving signals outputted from the laser intensity changeover part 71, the laser may be directly modulated at the laser beam sources 61 in place of the laser modulation at the AOM 62. Further, the intensity of the laser beams may be stabilized using a feed-forward control in place of the feedback control. Further, the levels set at the laser intensity changeover part 71 may be an arbitrary number of levels equal to or more than six levels.

What we claim is:

1. A photographic processing apparatus which exposes photographic papers using a laser beam modulated based on image data comprising:
   a laser beam emitting device;
   a changeover means for changing the level of a driving signal to any one of a plurality of discrete levels according to a coloring characteristic of a photographic paper, the level of the driving signal determining the intensity of a laser beam outputted from the laser beam emitting device, wherein said changeover means comprises an adjuster for adjusting the level of the driving signal according to an environmental factor so that the intensity of a laser beam outputted from the laser beam emitting device is fixed;
   a filter which reduces the intensity of the laser beam outputted from the laser beam emitting device; and
   filter control means for producing a signal indicative of an amount to change the laser intensity to any one of a plurality of levels according to the coloring characteristic of the photographic paper and providing the signal indicative of the amount of change to the filter.

2. A photographic processing apparatus according to claim 1, further comprising stabilizing means for stabilizing the intensity of the laser beam outputted from the laser beam emitting device.

3. A photographic processing apparatus according to claim 1, wherein the changeover means changes the intensity of the laser beam outputted from the laser beam emitting device in two to five levels.

4. A method for processing paper, comprising the steps of:
   receiving a signal indicating a coloring characteristic of a photographic paper;
   finding a level of a driving signal among a plurality of discrete levels according to the signal obtained in said step of receiving a signal, the driving signal determining the intensity of a laser beam outputted from a laser beam emitting device;

providing the driving signal to the laser beam emitting device;

controlling a filter that reduces the intensity of the laser beam outputted from the laser beam emitting device so as to change a laser intensity amount to any one of a plurality of levels according to the coloring characteristic of the photographic paper; and adjusting the level of the driving signal according to an environmental factor so that the intensity of a laser beam outputted from the laser beam emitting device is fixed.

* * * * *